Sept. 26, 1933.     R. L. WRIGHT     1,928,147
METER
Filed Oct. 25, 1930     3 Sheets-Sheet 1

Inventor
Robert L. Wright
By Jack A. Ashley
Attorney

Sept. 26, 1933.   R. L. WRIGHT   1,928,147
METER
Filed Oct. 25, 1930   3 Sheets-Sheet 2

Inventor
Robert L. Wright
By
Jack A. Ashley
Attorney

Sept. 26, 1933.  R. L. WRIGHT  1,928,147
METER
Filed Oct. 25, 1930   3 Sheets-Sheet 3
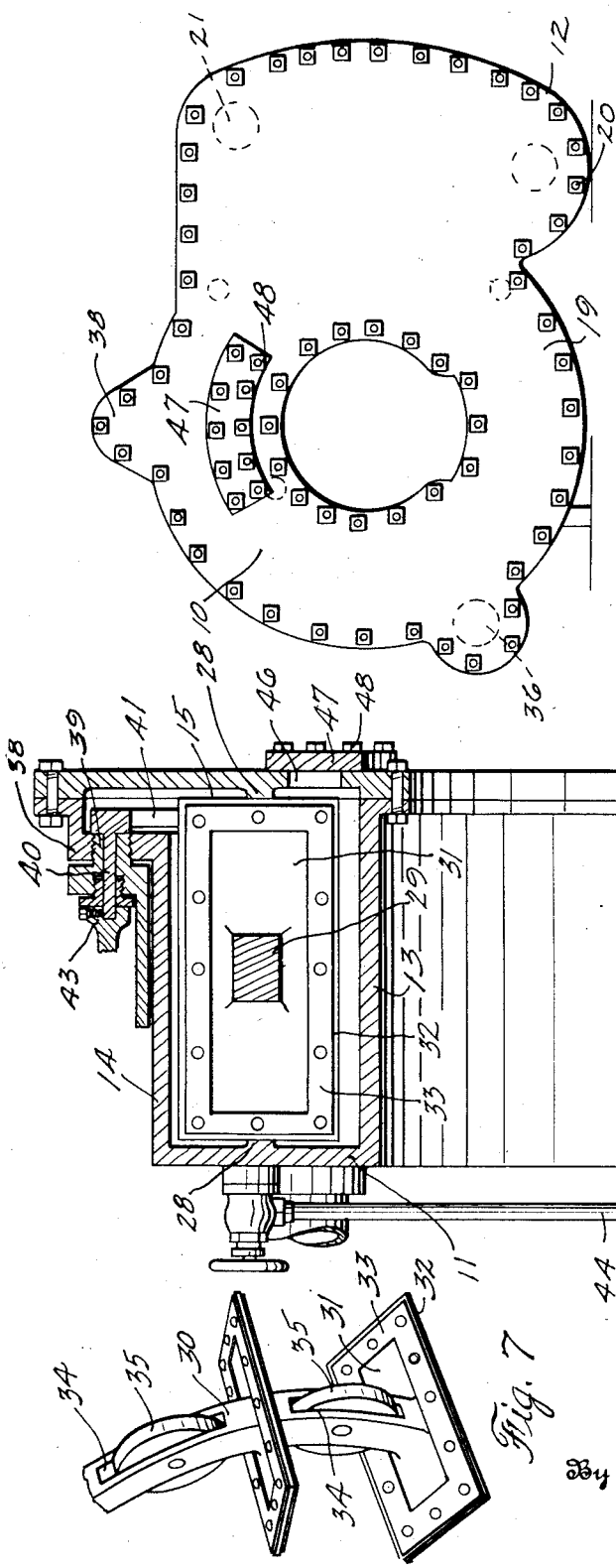
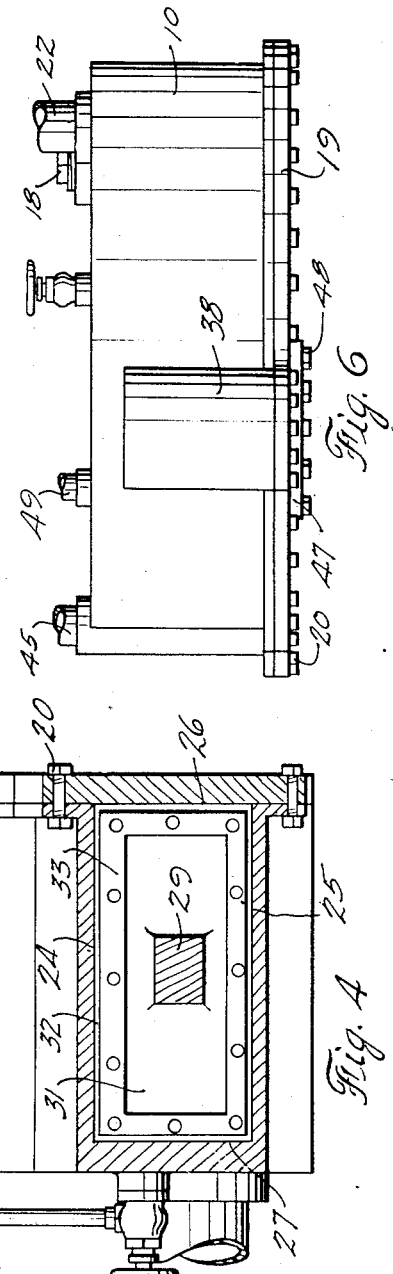
Inventor
Robert L. Wright
By Jack A. Ashley
Attorney Patented Sept. 26, 1933

1,928,147

UNITED STATES PATENT OFFICE 1,928,147

METER

Robert L. Wright, Tulsa, Okla.

Application October 25, 1930. Serial No. 491,298

5 Claims. (Cl. 73—37)

This invention relates to new and useful improvements in meters.

One object of the invention is to provide a meter of the rotary type involving certain improvements, whereby it is made more accurate and effective, particularly when handling gaseous fluids.

An important object of the invention is to provide a meter in which the measuring rotor is impelled by the weight of liquid being measured, rather than by the impact or velocity of such liquid.

A further object of the invention is to provide a meter wherein a fluid under pressure other than the liquid being measured is introduced and utilized to cause the meter to discharge against a pressure.

Another object of the invention is to provide a meter which will by-pass a limited amount of gas without affecting the accuracy of the meter.

Still another object of the invention is to provide a receiving chamber or reservoir on the inlet side of the meter, having capacity to store a sufficient quantity of liquid to assure a more uniform or satisfactory operation of the rotor and being equipped with an inlet in its upper portion, whereby the gas of a petroleum influent is given opportunity to rise above the settled liquid and the sand and extraneous matter is trapped out.

A further object of the invention is to provide a meter of the rotary type, wherein the outlet or discharge is so located with relation to the measuring chamber as to assure a sufficient quantity of liquid being present at all times in the measuring chamber, thus guaranteeing accurate measuring.

A construction designed to carry out the invention will be hereinafter described together with other features of the invention.

Figures 1, 8:
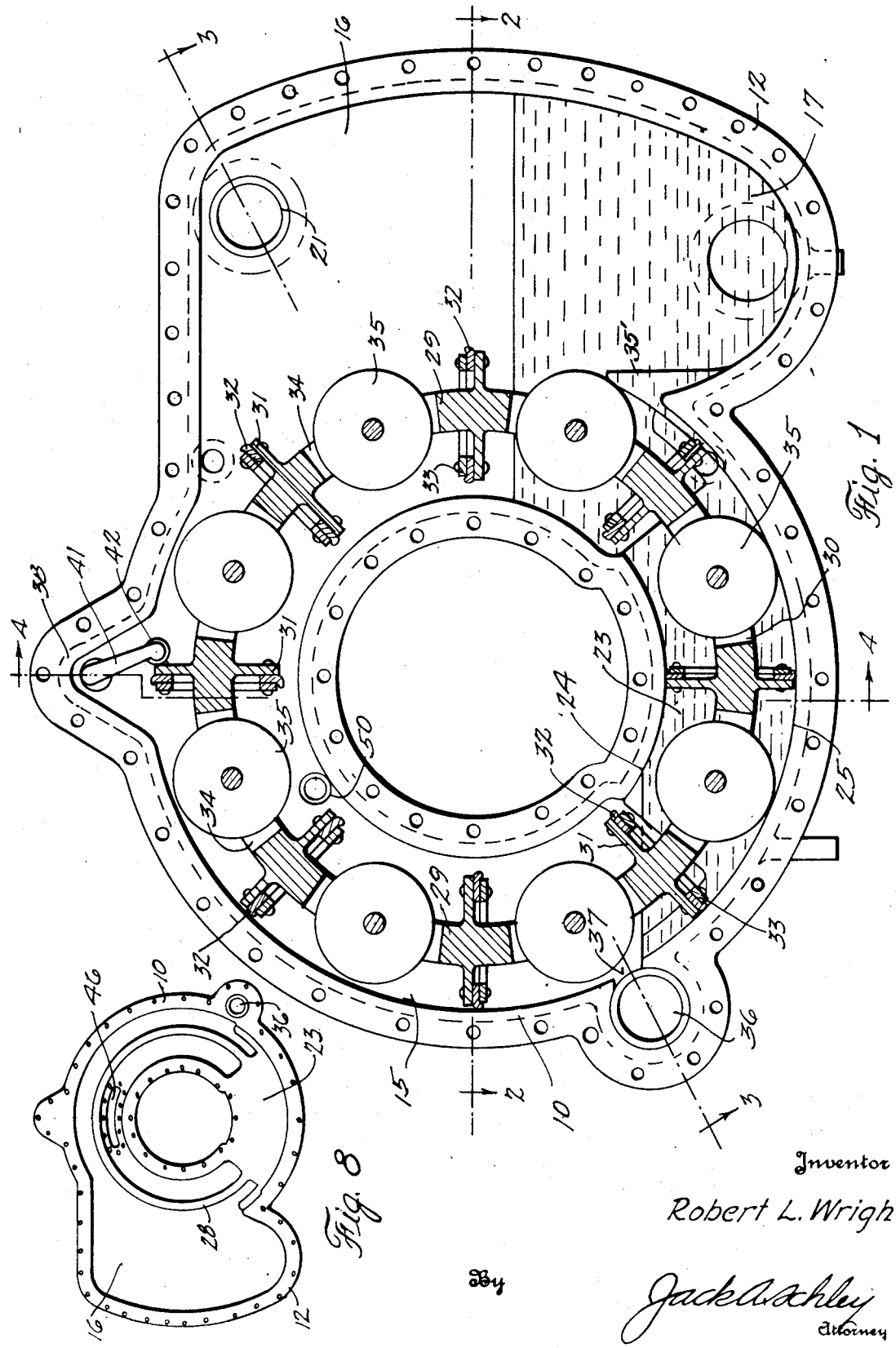
Figures 2, 3:
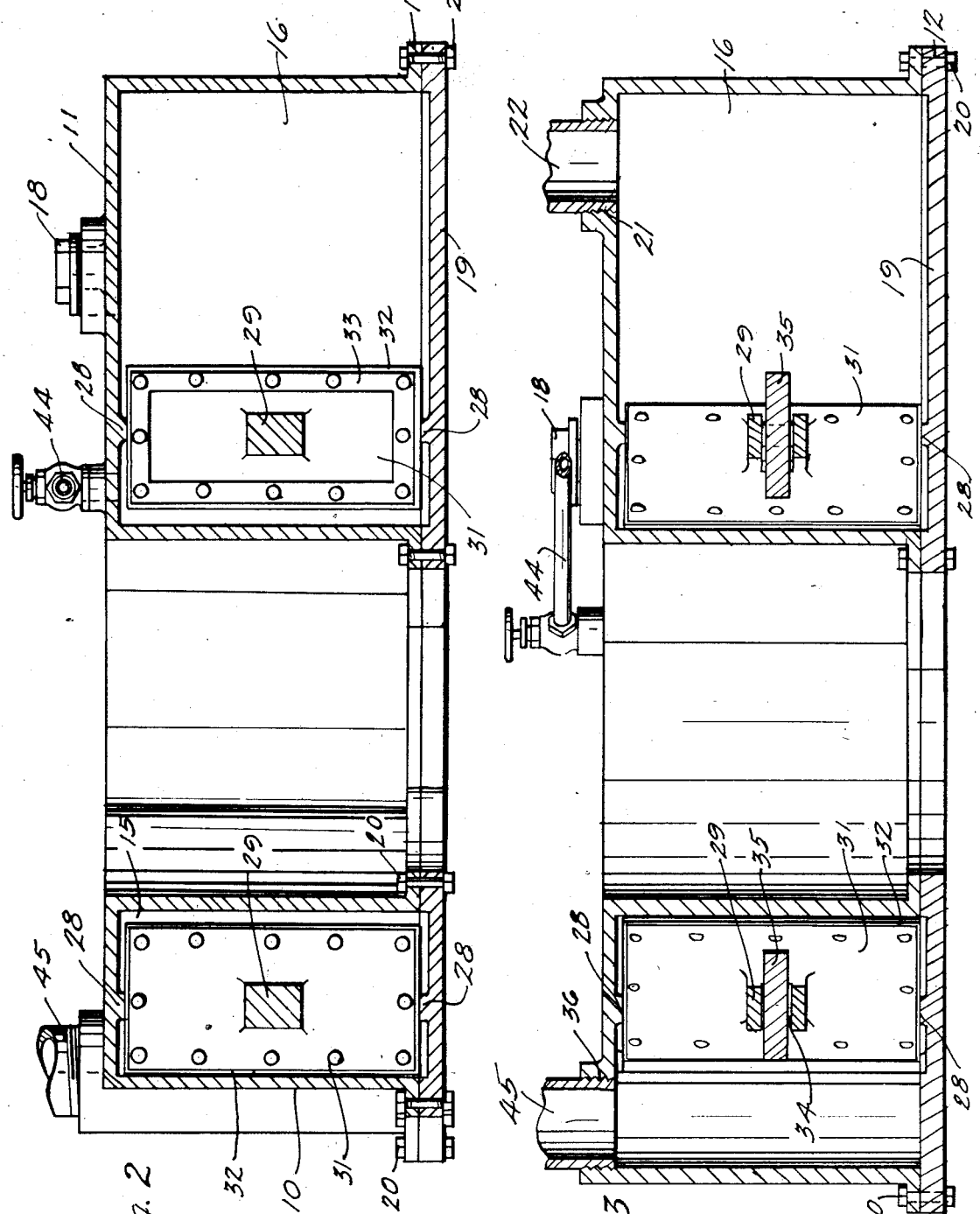

The invention will be more readily understood from a reading of the following specification and by reference to the accompanying drawings in which an example of the invention is shown, and wherein:

Figure 1 is a longitudinal vertical sectional view of a meter constructed in accordance with the invention, Figure 2 is a horizontal cross-sectional view taken on the line 2—2 of Figure 1, Figure 3 is a similar view taken on the line 3—3 of Figure 1, Figure 4 is a transverse vertical sectional view taken on the line 4—4 of Figure 1, Figure 5 is a reduced front elevation of the meter shown in Figure 1, Figure 6 is a plan view of the same, Figure 7 is a perspective view of a portion of the rotor, and Figure 8 is an elevation of the inner side of one of the side plates.

In the drawings the numeral 10 designates the housing of the meter which has its rear side plate 11 integral therewith. The front side of the housing is open and has a laterally directed marginal flange 12. The housing has an inner annular wall 13 and an outer wall 14 forming therebetween a circular channel 15. This leaves the center of the housing open.

At one side the channel opens into a vertical storage reservoir or chamber 16. A pocket 17 is formed at the bottom of the reservoir and this constitutes a trap for sand and other extraneous matter which may be periodically drained out by removing a plug 18 in the rear plate 11. A front plate 19 is fastened to the flange 12 by bolts 20. The reservoir 16 has an inlet opening 21 at its top for receiving a supply pipe 22.

The channel 15 which is preferably rectangular in cross-section has a measuring chamber 23 at its bottom disposed on each side of its vertical axis. The chamber is formed by concentric bosses 24 and 25 and parallel bosses 26 and 27, all of which have their faces machined. The boss 24 depends from the inner wall 13, while the boss 25 is built up upon the inner surface of the outer wall 14 below the boss 24. The boss 26 is formed on the inner face of the front plate and the boss 27 is located on the inner face of the rear plate. Circular guide ribs 28 extend concentrically on the inner faces of the front and rear plates within the channel 15. The ribs extend from each end of the bosses 26 and 27 and are flush therewith.

Rotatably mounted in the channel 15 is a rotor 29 in the form of an annulus. This rotor is formed of a ring 30 having equally spaced transverse blades 31. Each blade carries a marginal gasket 32 fastened thereon by a rectangular frame 33. Between the blades the ring has slots 34 in which guide wheels 35 are journaled.

The guide wheels are considerably less in diameter than the height of the measuring chamber so that when riding upon the boss 25 the remainder of the rotor outside of the sand chamber is free from contact with the walls of the channel. The exception to this is that the ends of the gaskets 32 ride on the ribs 28 and hold the blades in proper position to enter the measuring chamber. By this arrangement of mounting and supporting the rotor, all unnecessary frictional contact with the channel walls is obviated and the resistance offered to the free rotation of the rotor, except by the liquid, is reduced to a minimum in the channel.

The gaskets 32 are of such size as to engage and form a fluid-tight joint with faces of the bosses 24 to 27 inclusive, when the blades 31 are being forced through the measuring chamber 23. This prevents by-passing of the liquid around the blades, thereby preventing leaking and assuring accuracy. The rotor rotates in a clockwise (Figure 1) direction. A transverse discharge manifold 36 is formed integral with the outer wall 14 and extends transversely from the front plate 19 to the rear plate 11. The entrance to the manifold is formed by a transverse slot 37 in the wall 14 located above the axial center of the manifold. The bottom boss 25 has its left hand end extending to the lower edge of the discharge slot 37, whereby any sand or extraneous matter entering the measuring chamber will be carried therefrom by the gaskets and expelled through said slot.

Liquid entering the inlet opening 21 will be discharged into the lower portion of the reservoir 16. If the liquid should be petroleum oil, the gas admixed therewith will rise and pass into the upper portion of the channel 15. This liberated gas will travel in a counter-clockwise (Figure 1) direction around the channel and escape into the manifold 36 through the slot 37. This will free the oil from such gas and reduce the turbulence thereof.

As resistance, due to the frictional contact of the gaskets 32 with the walls of the measuring chamber 23, will be offered to the rotation of the rotor 29, a head of the liquid will be built up in the channel 15 (inlet side) and the reservoir 16. But when the discharge manifold 36 is subjected only to atmospheric pressure the liquid in the channel 15 adjacent the manifold 36 will stand level with the lower edge of the slot 37, thus being considerably lower on the discharge side of the channel than on the inlet side thereof.

When the liquid has built up enough head on the inlet side of the channel 15, the weight of the liquid will generate sufficient force to impel the rotor 29, whereby liquid will be forced through the chamber 23. Should for any reason the liquid be built up to an excessive head, it will overflow the top of the channel 15 and pass down the outlet side and escape through the slot 37. Any gas which enters the housing will by-pass through the channel and equalize the pressure throughout said housing.

Any registering mechanism can be actuated by the rotor 29. For simplicity I have shown a small dome 38 at the upper center of the housing 10 contiguous to the front plate 19. As is best shown in Figure 4, a bushing 39 screwed into the rear wall of this dome has a rock shaft 40 journaled therein. A trip lever 41 having its upper end fastened on said shaft depends in the dome into the path of the blades 31 (Figure 1). A small roller 42 on the lower end of the lever is contacted by the blades. Each time the lever is swung or tripped by a blade the shaft 40 is rocked and a coupling member 43 carried thereby is likewise actuated. Any register which may be connected with the coupling will be operated thereby. The weight of the roller 42 assisted by means in the register (not shown) causes the lever 41 to return to its original position.

A gauge tube 44 of the usual construction is connected with the top and bottom of the housing adjacent the entrance to the channel 15 from the reservoir 16 to indicate the height of the liquid in the housing. This gauge is mounted on the rear plate 11. A discharge pipe 45 extends from the rear end of the manifold 36. A curved inspection opening 46 is provided in the front plate 19 just above the wall 13 and below the rib 28 at the top of the channel 15. A cover plate 47 is fastened over this opening by machine screws 48. By removing this plate access to the rotor is had.

Where the liquid is being discharged against a pressure at the manifold 36, said liquid would head up in the channel 15 on the outlet side and counter-pressure would have to be exerted on the liquid on the inlet side to operate the rotor. In order to overcome this difficulty a gas inlet pipe 49 enters an opening 50 in the rear plate 11 on the outlet side of the channel and at the upper portion thereof. Gas at a pressure equal to the pressure to be equalized is supplied to the housing. This gas pressure will hold the liquid down to the bottom of the slot 37, but will allow said liquid to head up on the inlet side, whereby gravity operation of the rotor will be simulated.

The relation of the pressures at the inlets 21 and 50 and the outlet 37 is always such that the flow of the liquid will be in a direction toward the outlet 37. This meter is particularly designed for measuring liquids which are delivered to it under pressure. For instance, where oil flowing from a well is admitted through the inlet 21, gas is at the same time constantly admitted through the inlet 50. These sources of supply are substantially constant and the source of supply of the gas causes it to be discharged into the casing 10 at a pressure greater than the pressure at which the oil is admitted. It will be noted that the opening 50 is much smaller than the opening 21 and also that the gas upon entering the meter immediately expands to a lower pressure because of the large open space above the liquid levels. The pressure within the casing is equalized because any excess of gas will escape through the outlet 37.

The outlet slot 37 is somewhat restricted and as the meter, when in use, operates continuously, liquid will be constantly flowing out through the opening 37 and this will obstruct a free escape of the gas. From this it will be seen that the gas which enters the casing will expand therein and will pass out through the opening 37 with the liquid, but the liquid will so restrict the opening as to prevent all of the gas passing out. It is obvious that when the pressure of the gas in the casing becomes too great it will force the liquid away from the slot 37 and thus escape. It will be noted that the gas inlet 50 is placed on the outlet side of the vertical channel and the tendency of this gas is to flow toward the opening 37, thus seeking an outlet rather than flowing to the opposite side of the casing. Referring to Figure 1, it will be noted that the gas tends to flow in a counter-clockwise direction, while the liquid flows in a clockwise direction.

In order to properly support the rotor 29 a narrow lug 35' is built up at the entrance of the chamber 23 and in the center of the channel 15. This lug is just wide enough to receive and support the wheels 35 and co-acts with the bottom boss 25 in supporting the rotor. It is pointed out that the outlet slot 37 is at such an elevation as to assure a stand of liquid in the measuring chamber from the bottom boss 25 to the top boss 24. This provides a solid body of liquid, always present, when a pair of blades are passing through the chamber 23. Such an arrangement guarantees accuracy and such would not be the case if the outlet was below the top of the chamber. While it is preferable to elevate the inlet opening 21 it is not essential to the invention that it be so elevated.

Various changes in the size and shape of the different parts, as well as modifications and alterations, may be made within the scope of the appended claims.

Having illustrated and described a preferred form of the invention, what I claim is:

1. In a rotary liquid meter, a housing having an upright circular channel provided with a measuring chamber at its bottom, the housing having an inlet to the channel at one side of said channel and said housing also having an outlet from said channel at the opposite side thereof, a rotor ring mounted in the channel, blades carried by the ring and having marginal gaskets, guide wheels supporting the ring and blades, the wheels supporting the blades out of contact with the walls of the channel except those blades which are in the measuring chamber, a vertical reservoir at the inlet side of the channel and having an influent inlet at its upper end, an outlet manifold at the lower outlet side of the channel and connected with the channel, the measuring chamber extending between the reservoir and the manifold, and means actuated by the blades for operating an indicating device.

2. A meter as set forth in claim 1, and a gas supply pipe connected to the upper portion of the channel and adapted to supply gas at a greater pressure than the pressure of the liquid.

3. A meter as set forth in claim 1, and circular guide ribs for the ends of the gaskets of the blades on the inner sides of the front and back walls of the housing substantially flush with the front and back walls of the measuring chamber.

4. In a rotary liquid meter, a housing having an upright circular channel, curved bosses at the bottom of the channel forming a measuring chamber, a rotor ring mounted in the channel and chamber, blades carried by the ring, guide wheels supporting the ring, a trip lever at the top of the channel in the path of the blades, a shaft journaled in the housing and supporting the lever, an inlet storage reservoir at one side of the housing and opening to the channel, and an outlet manifold extending transversely of the housing at the other side of the housing from the reservoir, the outer wall of the housing having a transverse slot connecting the manifold with the channel.

5. In a rotary liquid meter, a housing having a continuous upright channel provided at its bottom with a measuring chamber, an endless impelling member mounted for movement through said channel and chamber, the housing having an inlet and the channel being open to receive liquid for one end of its measuring chamber, said housing also having an outlet connected with the channel beyond the opposite end of the measuring chamber, the channel of the housing having sufficient elevation to permit the building up therein of a hydrostatic head of liquid adequate to operate the impelling member by gravity, the upper portion of the channel providing an overflow for excesses of fluid and liquid from the inlet to the outlet side and by-passing the chamber, means actuated by the rotor for operating an indicating device, and means for supplying a pressure fluid other than the liquid being measured and at a higher pressure, whereby the liquid may be discharged from the housing against a pressure above that of atmosphere.

ROBERT L. WRIGHT.